(12) United States Patent
Kanai et al.

(10) Patent No.: US 7,965,765 B2
(45) Date of Patent: Jun. 21, 2011

(54) ADJUSTMENT METHOD, CIRCUIT, RECEIVER CIRCUIT AND TRANSMISSION EQUIPMENT OF WAVEFORM EQUALIZATION COEFFICIENT

(75) Inventors: Hisaaki Kanai, Yokohama (JP); Norio Chujo, Tokyo (JP); Masayoshi Yagyu, Hannou (JP)

(73) Assignee: Hitachi, Ltd., Tokyo (JP)

( * ) Notice: Subject to any disclaimer, the term of this patent is extended or adjusted under 35 U.S.C. 154(b) by 753 days.

(21) Appl. No.: 11/965,783

(22) Filed: Dec. 28, 2007

(65) Prior Publication Data

US 2008/0159460 A1    Jul. 3, 2008

(30) Foreign Application Priority Data

Dec. 28, 2006 (JP) ................ 2006-355136

(51) Int. Cl.
*H03H 7/30* (2006.01)
(52) U.S. Cl. .................................. 375/229
(58) Field of Classification Search .......... 375/229, 375/219, 232, 233, 230, 238; 369/48, 58
See application file for complete search history.

(56) References Cited

U.S. PATENT DOCUMENTS

| | | | |
|---|---|---|---|
| 6,295,316 B1 * | 9/2001 | Tonami et al. | 375/230 |
| 6,532,260 B2 * | 3/2003 | Oi | 375/238 |
| 2001/0019580 A1 * | 9/2001 | McDonald et al. | 375/219 |
| 2005/0226355 A1 | 10/2005 | Kibune et al. | |
| 2006/0034358 A1 | 2/2006 | Okamura | |
| 2006/0176946 A1 | 8/2006 | Yamaguchi | |

FOREIGN PATENT DOCUMENTS

| | | |
|---|---|---|
| JP | 2005-303607 | 10/2005 |
| JP | 2006-60808 | 3/2006 |
| JP | 2006-222809 | 8/2006 |

OTHER PUBLICATIONS

Kromer, Christian et al, "*A 100-mW 4 ×10 Gb/s Transceiver in 80-nm CMOS for High-Density Optical Interconnects*," IEEE Journal of Solid States Circuits, vol. 40, No. 12, Dec. 2005; pp. 2667-2679. USA.

Office Action in Japanese counterpart application, dated Mar. 8, 2011 (copy not provided).

* cited by examiner

*Primary Examiner* — Khai Tran
(74) *Attorney, Agent, or Firm* — Antonelli, Terry, Stout & Kraus, LLP.

(57) ABSTRACT

In an adjustment method of waveform equalization coefficient, one of jitter and amplitude is measured only in a case of an arbitrary signal sequence and a waveform equalization coefficient is adjusted. Particularly, using a signal of received signals other than a 010 signal or a 101 signal, code inversion time is measured. Since the code inversion time in a case where such signals are used becomes steeper in comparison with that in the conventional technique, adjustment time of the waveform equalization coefficient can be reduced.

6 Claims, 19 Drawing Sheets

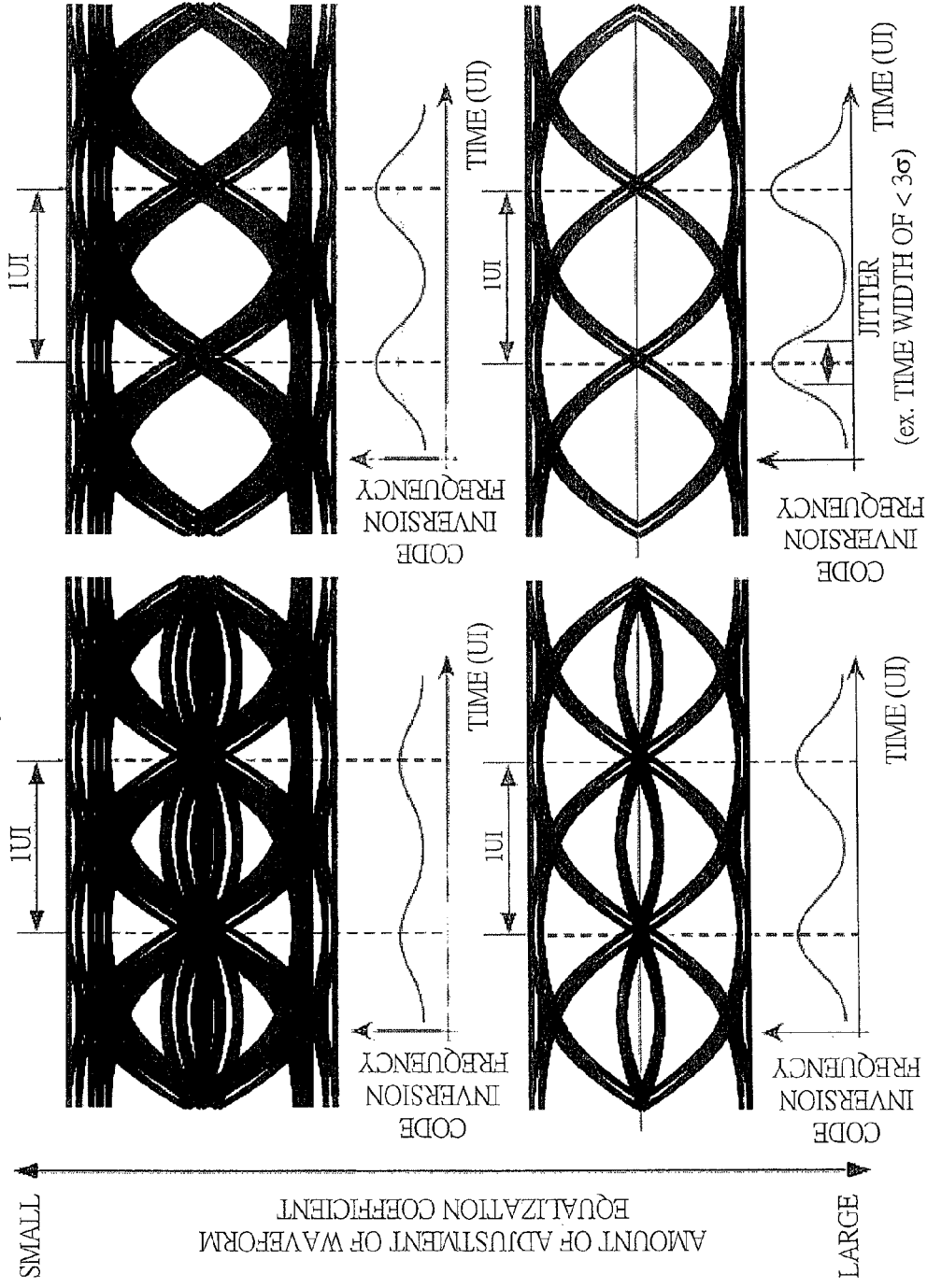

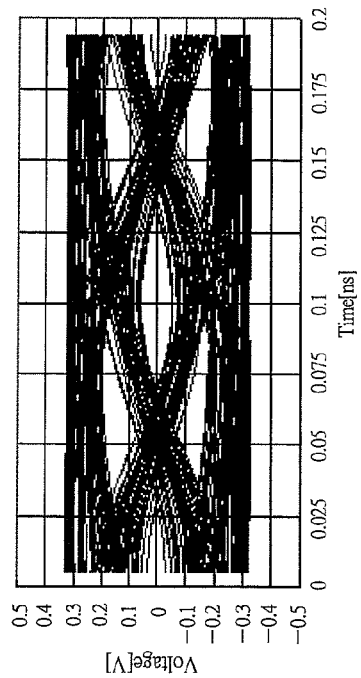
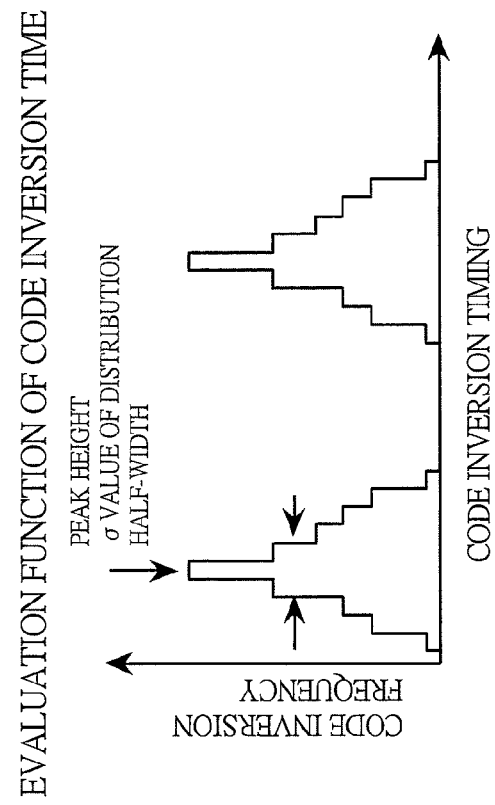
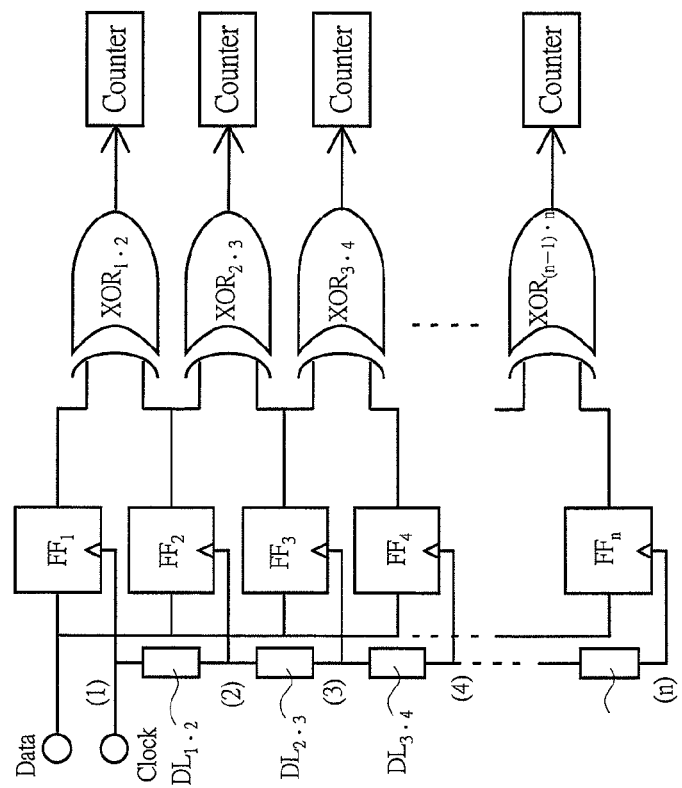

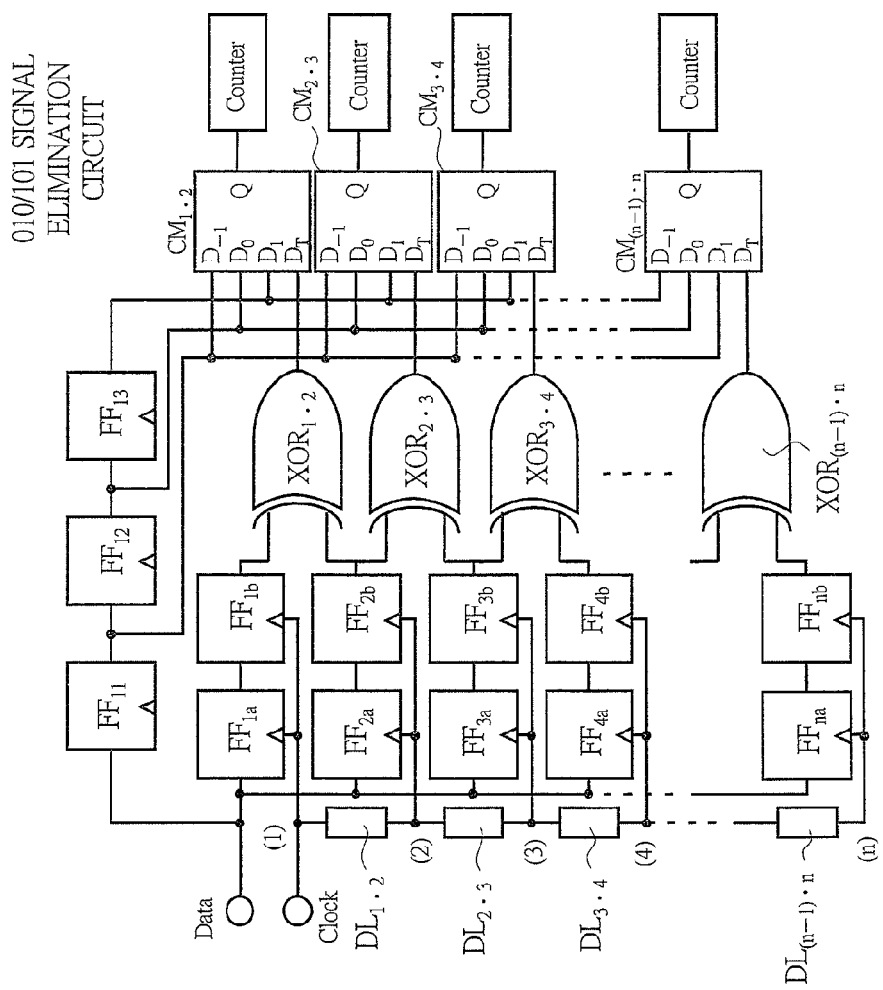

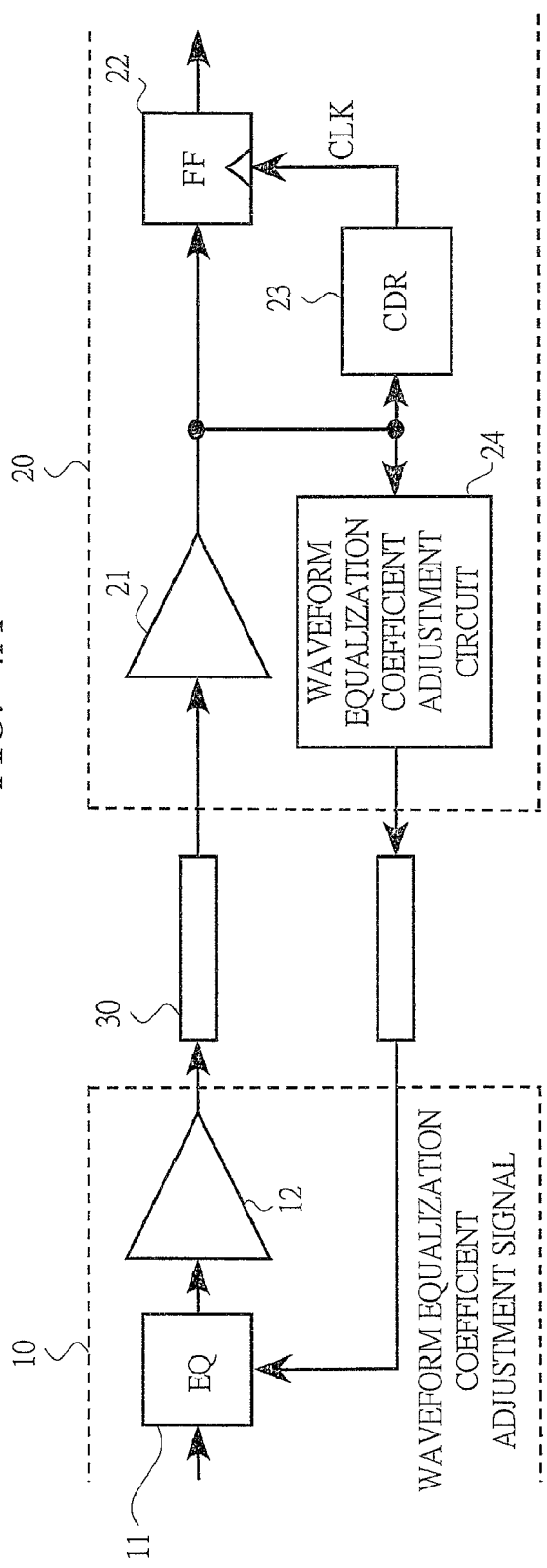

FIG. 7A
FIR-TYPE WAVEFORM EQUALIZATION CIRCUIT

010/101 SIGNAL ELIMINATION CIRCUIT ON → ROUGH ADJUSTMENT OF FIR-TYPE COEFFICIENT → 010/101 SIGNAL ELIMINATION CIRCUIT OFF → FINE ADJUSTMENT OF FIR-TYPE COEFFICIENT → NORMAL OPERATION

FIG. 7B
FIR-TYPE + IIR-TYPE WAVEFORM EQUALIZATION CIRCUIT

010/101 SIGNAL ELIMINATION CIRCUIT ON → ROUGH ADJUSTMENT OF FIR-TYPE COEFFICIENT → 010/101 SIGNAL ELIMINATION CIRCUIT OFF → FINE ADJUSTMENT OF FIR-TYPE COEFFICIENT → ADJUSTMENT OF IIR-TYPE COEFFICIENT → NORMAL OPERATION

FIG. 7C
FIR-TYPE + IIR-TYPE WAVEFORM EQUALIZATION CIRCUIT

010/101 SIGNAL ELIMINATION CIRCUIT ON → ROUGH ADJUSTMENT OF FIR-TYPE COEFFICIENT → 010/101 SIGNAL ELIMINATION CIRCUIT OFF → FINE ADJUSTMENT OF FIR-TYPE COEFFICIENT ⇄ ADJUSTMENT OF IIR-TYPE COEFFICIENT → NORMAL OPERATION

TRANSMISSION WAVEFORM

RECEPTION WAVEFORM

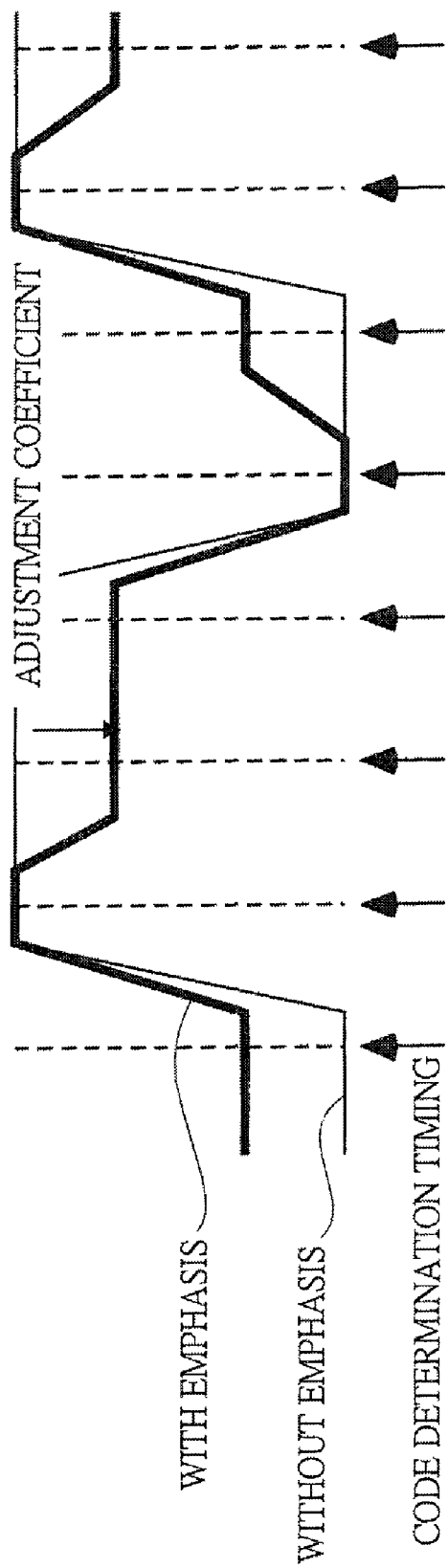

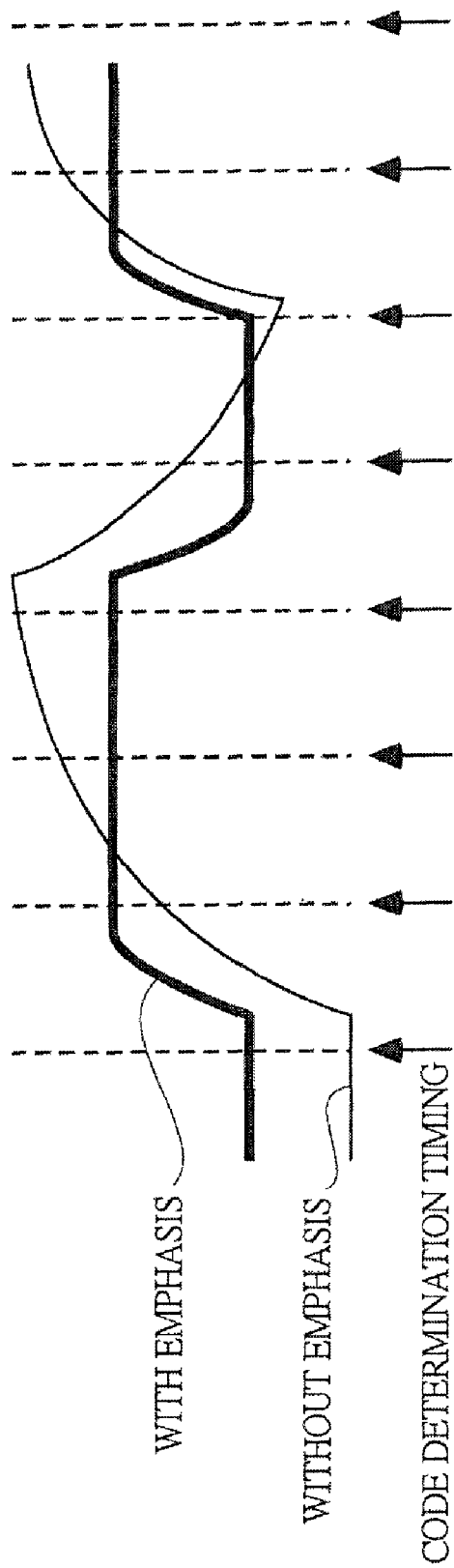

FIG. 12
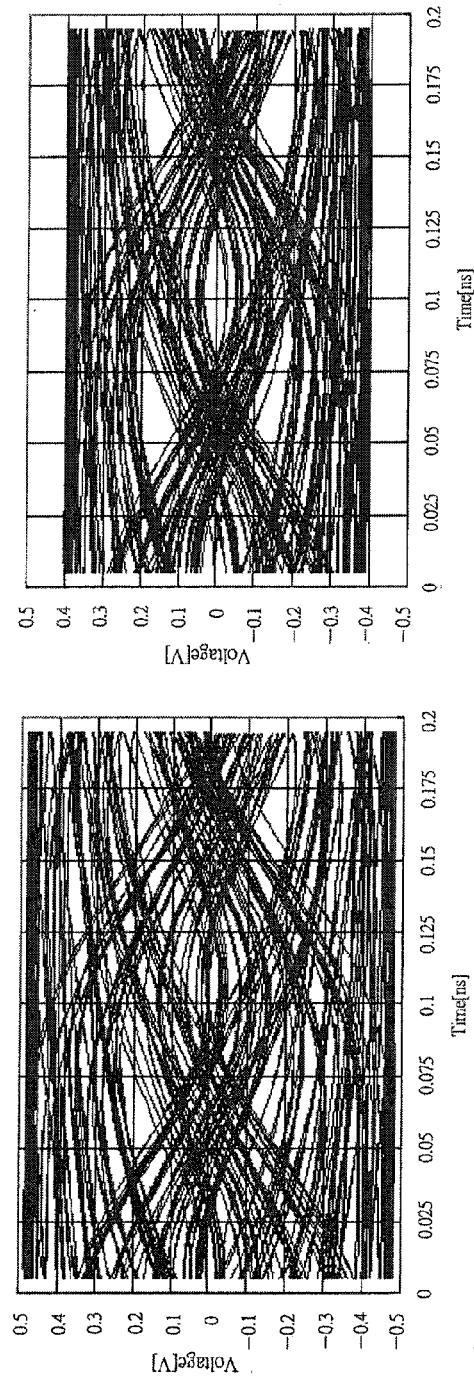
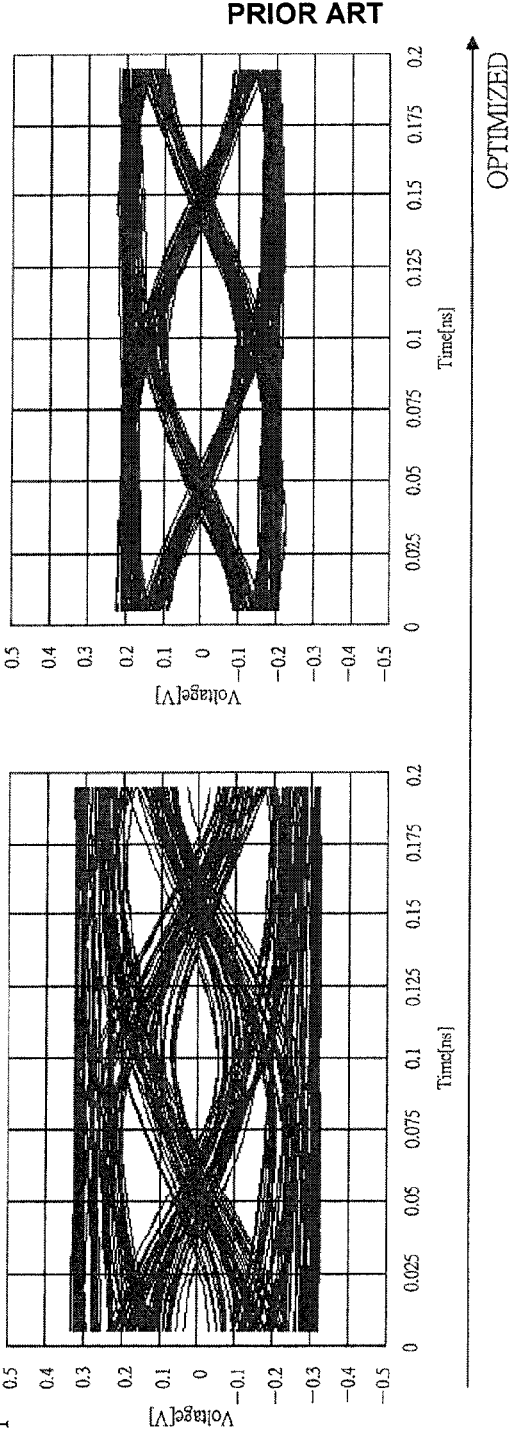
NO ADJUSTMENT → OPTIMIZED
PRIOR ART

ADJUSTMENT METHOD, CIRCUIT, RECEIVER CIRCUIT AND TRANSMISSION EQUIPMENT OF WAVEFORM EQUALIZATION COEFFICIENT

CROSS-REFERENCE TO RELATED APPLICATION

The present application claims priority from Japanese Patent Application No. JP 2006-355136 filed on Dec. 28, 2006, the content of which is hereby incorporated by reference into this application.

TECHNICAL FIELD OF THE INVENTION

The present invention relates to an adjustment technique of waveform equalization coefficient, and in particular to such technique applied to an information apparatus such as a PC, a router, a server, long-distance signal transmission equipment and the like.

BACKGROUND OF THE INVENTION

According to review by the inventors, with respect to the conventional adjustment technique of waveform equalization coefficient, following technique is considered. For example, there is a method of measuring code inversion time of all received signals and obtaining an equalization coefficient minimizing jitter (IEEE 1-4244-0006-6/06 p. 242, p. 240 (Non-Patent Document 1)).

SUMMARY OF THE INVENTION

Now, with respect to the adjustment technique of waveform equalization coefficient described above, the following is apparent from a result of the review conducted by the inventors. For example, in the conventional adjustment technique of waveform equalization coefficient described above, there is a problem that if transmission loss increases, it is necessary to raise evaluation accuracy of code inversion time and much time is required for adjustment. This problem is specifically explained below with reference to FIG. 10A to FIG. 15.

In recent years, according to increase of transmission capacity handled by an information apparatus, transmission capacity per one signal line increases beyond Gbps. Since the increase of transmission capacity causes increase of a transmission rate between a driver circuit and a receiver circuit via a transmission line as shown in FIG. 10A and causes increase of loss of a signal from the driver circuit to the receiver circuit at the transmission line as shown in FIG. 10B, and therefore, as shown in FIGS. 10C and 10D, when a received waveform is viewed with respect to a transmitted waveform, a waveform under transmission degrades, as a result, an occurrence rate of a code error is increased.

As technique for compensating the waveform degradation, emphasis or a high-pass filter is used. FIGS. 11A and 11B show transmitted waveforms and received waveforms in a case of using emphasis and a case of using no emphasis. And, when the transmission loss is large, a decision feedback equalizer (DFE) performing waveform equalization by feeding back data determined at the receiver circuit can be used.

In the conventional waveform equalization coefficient adjustment such as the emphasis or the high-pass filter, a signal transmitted from the driver circuit is received by the receiver circuit, distribution of the code inversion time of all the received signals is measured and the equalization coefficient is adjusted so that the evaluation criterions (for example, the peak, the half-width and the standard deviation) in the histogram of a code inversion timing is optimized with respect to change of a waveform from a non-adjustment waveform to an optimized waveform caused by the waveform equalization as shown in FIG. 12 (an example of four stages is shown in FIG. 12), that is, the equalization coefficient minimizing jitter is obtained. Alternatively, as shown in FIG. 14, the equalization coefficient is adjusted so that the evaluation criterions (for example, the peak, the half-width and the standard deviation) in the histogram of amplitude is optimized, that is, the equalization coefficient is adjusted so that distribution of amplitude of all received signals at an intermediate timing between peaks of the jitter is minimized.

However, in the conventional method, in a case where the transmitted signal has a random pattern and the loss at the transmission line is large, significant difference hardly appears in the abovementioned jitter distribution or amplitude distribution and difference hardly occurs in the distribution. For example, as shown in FIG. 15, in a case of the code inversion timing distribution with respect to time, difference hardly occurs in distribution of the code inversion time, and therefore, the number of accumulation times must be increased in order to cause sufficient difference in the distribution. As a result, a problem that much time is required for adjustment of equalization coefficient occurs.

In view of these circumstances, an object of the present invention is to provide an adjustment technique of waveform equalization coefficient capable of reducing adjustment time of the waveform equalization coefficient.

The novel characteristics of the present invention will be apparent from the description of this specification and the accompanying drawings.

The typical ones of the inventions disclosed in this application will be briefly described as follows.

The present invention has a characteristic that an adjustment method of waveform equalization coefficient in which jitter or amplitude is measured only in a case of an arbitrary signal sequence and the waveform equalization coefficient is adjusted is adopted. Particularly, the code inversion time is measured using a signal other than a 010 signal or a 101 signal in received signals. Since the code inversion time in case of using such a signal is steeper than that in the conventional technique, the adjustment time of the waveform equalization coefficient can be reduced.

These and other objects, features and advantages of the invention will be apparent from the following more particular description of preferred embodiments of the invention, as illustrated in the accompanying drawings.

BRIEF DESCRIPTIONS OF THE DRAWINGS

FIG. 1A is a diagram showing one example of an adjustment method of waveform equalization coefficient of comparative technique;

FIG. 1B is a diagram showing one example of an adjustment method of waveform equalization coefficient of an embodiment of the present invention;

FIG. 2A is a diagram showing a configuration diagram of a waveform equalization coefficient adjustment circuit of one example of a waveform equalization coefficient adjustment circuit of the comparative technique to the present invention;

FIG. 2B is a diagram showing a waveform diagram of the one example of the waveform equalization coefficient adjustment circuit of the comparative technique to the present invention;

FIG. 2C is a diagram showing a code inversion distribution diagram of the one example of the waveform equalization coefficient adjustment circuit of the comparative technique to the present invention;

FIG. 3A is a diagram showing a configuration diagram of a waveform equalization coefficient adjustment circuit of one example of a waveform equalization coefficient adjustment circuit of the embodiment of the present invention;

FIG. 3B is a diagram showing an input and output data table in OFF-time of a 010/101 signal elimination circuit of the one example of the waveform equalization coefficient adjustment circuit of the embodiment of the present invention;

FIG. 3C is a diagram showing an input and output data table in ON-time of the 010/101 signal elimination circuit of the one example of the waveform equalization coefficient adjustment circuit of the embodiment of the present invention;

FIG. 4A is a diagram showing a configuration diagram of one example of a driver circuit and a receiver circuit of the embodiment of the present invention;

FIG. 4B is a diagram showing code inversion timing distribution of the one example of a driver circuit and a receiver circuit of the comparative technique;

FIG. 4C is a diagram showing code inversion timing distribution of the one example of the driver circuit and the receiver circuit of the embodiment of the present invention;

FIG. 7A is a diagram showing a waveform equalization coefficient adjustment flow of an FIR-type using the driver circuit and the receiver circuit shown in FIG. 6 as an example according to the embodiment of the present invention;

FIG. 7B is a diagram showing a waveform equalization coefficient adjustment flow of an FIR-type+IIR-type using the driver circuit and the receiver circuit shown in FIG. 6 as an example according to the embodiment of the present invention;

FIG. 7C is a diagram showing a waveform equalization coefficient adjustment flow of the FIR-type+IIR-type using the driver circuit and the receiver circuit shown in FIG. 6 as an example according to the embodiment of the present invention;

FIG. 11A is a diagram showing examples of transmitted waveforms in a case using emphasis and a case using no emphasis according to the conventional technique;

FIG. 11B is a diagram showing examples of received waveforms in the case using emphasis and the case using no emphasis according to the conventional technique;

FIG. 12 is a diagram showing one example of waveform change by waveform equalization from a non-adjustment waveform to an optimized waveform of the conventional technique;

Figure 14:
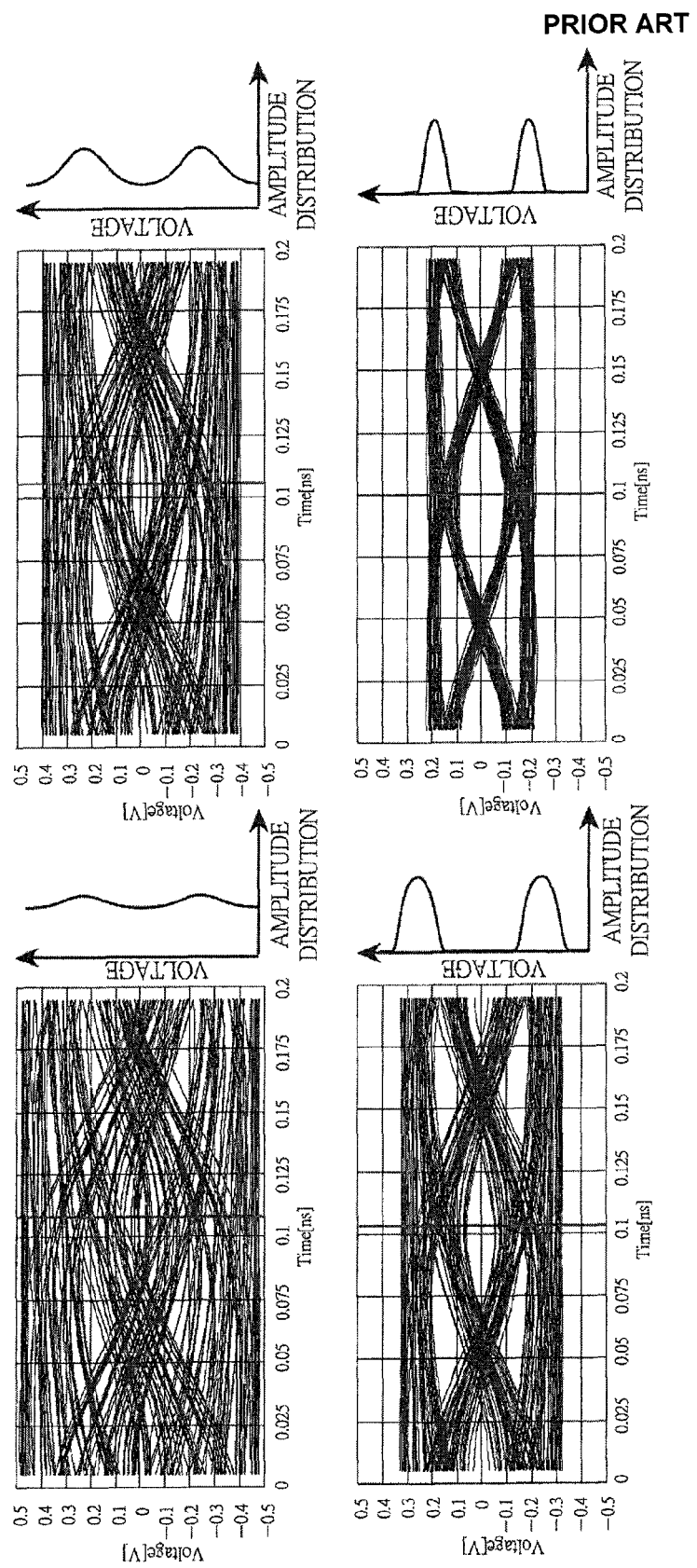
Figure 15:
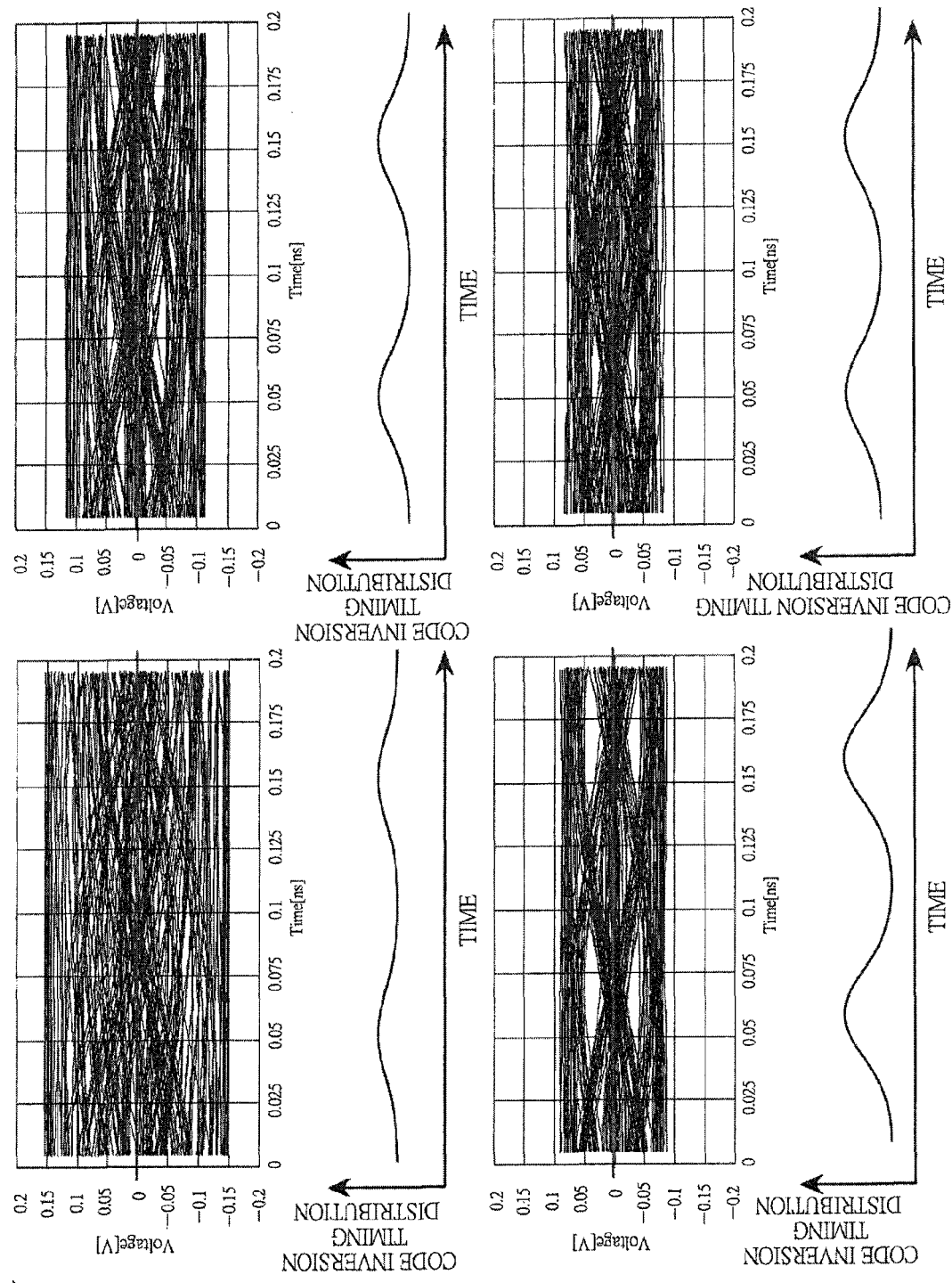

FIG. 14 is a diagram showing one example of an adjustment method of waveform equalization coefficient (amplitude distribution with respect to an voltage or histogram of amplitude) of the conventional technique; and FIG. 15 is a diagram showing one example of the adjustment method of waveform equalization coefficient (code inversion timing distribution with respect to time or histogram of a code inversion timing) of the conventional technique in a case of large loss.

DESCRIPTIONS OF THE PREFERRED EMBODIMENTS

Hereinafter, embodiments of the present invention will be described in detail with reference to the accompanying drawings. Note that the components are denoted by the same reference symbols throughout the drawings for describing the embodiment, and the repetitive description thereof will be omitted.

Explanation of embodiments will be made with reference to comparative technique according to need for easy understanding of a characteristic of the present invention.
(Waveform Equalization Coefficient Adjustment Method)

FIGS. 1A and 1B are diagrams showing examples of adjustment methods of waveform equalization coefficient of a present embodiment and comparative technique (FIG. 1A: Comparative technique, FIG. 1B: the present embodiment).

As shown in FIG. 1B, the embodiment of the present invention is an adjustment method providing a circuit measuring jitter or amplitude using only arbitrary signals of signals received by a receiver circuit in comparison with the comparative technique. By using a signal pattern making fluctuation of an evaluation criterion large with respect to a waveform equalization coefficient for the adjustment of waveform equalization coefficient, adjustment time of the waveform equalization coefficient can be reduced.

Particularly, by configuring a waveform equalization coefficient adjustment circuit so that the jitter or the amplitude is not measured when a code before one received data and a code after the received data are inverted from that of the received data (010 and 101), difference occurs in code inversion distribution (code inversion frequency with respect to time (UI)) and large effect can be obtained. Firstly, the jitter or the amplitude is measured using signals other than a 010 signal and a 101 signal, a waveform equalization coefficient is roughly adjusted so as to make the distribution small, and then, the waveform equalization coefficient is finely adjusted so as to make the distribution of the jitter or the amplitude small using all signals. Accordingly, the adjustment time can be reduced in comparison with the conventional technique.
(Waveform Equalization Coefficient Adjustment Circuit)

FIGS. 2A, 2B and 2C are diagrams showing one example of a waveform equalization coefficient adjustment circuit of the comparative technique (FIG. 2A: a configuration diagram of the waveform equalization coefficient adjustment circuit, FIG. 2B: a waveform diagram, FIG. 2C: a code inversion distribution diagram). FIGS. 3A, 3B and 3C are diagrams showing one example of a waveform equalization coefficient adjustment circuit of the present embodiment (FIG. 3A: a configuration diagram of the waveform equalization coefficient adjustment circuit, FIG. 3B: an input and output data table in OFF-time of a 010/101 signal elimination circuit, FIG. 3C: an input and output data table in ON-time of the 010/101 signal elimination circuit).

As the waveform equalization coefficient adjustment circuit of the comparative technique, as shown in FIG. 2A, in a circuit configuration including n latches $FF_1$, $FF_2$, ..., $FF_n$, (n−1) delay elements $DL_{1\cdot2}$, $DL_{2\cdot3}$, ..., $DL_{(n-1)\cdot n}$ and (n−1) XOR gates $XOR_{1\cdot2}$, $XOR_{2\cdot3}$, ..., $XOR_{(n-1)\cdot n}$, a method in which a plurality of (n) latches $FF_1$ to $FF_n$ having an input of received data Data is provided and connected in parallel, they are caused to operate in synchronized with clocks Clock having different timings from the delay elements $DL_{1\cdot2}$ to $DL_{(n-1)\cdot n}$, signals are outputted from the XOR gates $XOR_{1\cdot2}$ to $XOR_{(n-1)\cdot n}$ when data codes of adjacent latches of the latches $FF_1$ to $FF_n$ are inverted and count is performed at a counter is a general code inversion timing measurement method. A waveform (voltage: Voltage (V) with respect to time: Time (ns)) obtained by adjustment of equalization coefficient in this case is shown in FIG. 2B. In this adjustment of equalization coefficient, adjustment is performed so that an evaluation criterion of code inversion time such as peak height of code inversion, σ value of distribution or half-width is optimized.

On the other hand, a waveform equalization coefficient adjustment circuit of the present embodiment adopts the adjustment method of waveform equalization coefficient of FIG. 1B described above and can be realized by adding a latch delaying received data by one bit and a comparison circuit outputting data in a case of an arbitrary data sequence. That is, as shown in FIG. 3A, received data is inputted, in addition to n×2 latches $FF_{1a}$, $FF_{2a}$, ..., $FF_{na}$, $FF_{1b}$, $FF_{2b}$, ..., $FF_{nb}$ composed of 2-stages connected in parallel, (n−1) delay elements $DL_{1\cdot2}$, $DL_{2\cdot3}$, ..., $DL_{(n-1)\cdot n}$ operating the 2×n latches in synchronized with clocks having different timings and (n−1) XOR gates $XOR_{1\cdot2}$, $XOR_{2\cdot3}$, ..., $XOR_{(n-1)\cdot n}$ outputting signals when data codes of adjacent latches of the n×2 latches are inverted, a 010/101 signal elimination circuit is added.

The 010/101 signal elimination circuit comprises three latches $FF_{11}$, $FF_{12}$ and $FF_{13}$ connected in series and delaying received data by one bit and (n−1) comparison circuits $CM_{1\cdot2}$, $CM_{2\cdot3}$, ..., $CM_{(n-1)\cdot n}$ inserted between XOR gates $XOR_{1\cdot2}$ to $XOR_{(n-1)\cdot n}$ and counters. The comparison circuits $CM_{1\cdot2}$ to $CM_{(n-1)\cdot n}$ are each provided with a data $D_0$ terminal inputted through two latches $FF_{11}$, $FF_{12}$, a data $D_{-1}$ terminal having an input before that of the data $D_0$ by one symbol inputted through three latches $FF_{11}$ to $FF_{13}$, a data $D_1$ terminal having an input after that of the data $D_0$ by one symbol inputted through one latch $FF_{11}$, a data $D_T$ terminal having an input from each of the XOR gates $XOR_{1\cdot2}$ to $XOR_{(n-1)\cdot n}$ and an output terminal Q to the counter.

In such a circuit configuration, when code of the data $D_0$ and codes of the data $D_{-1}$ before the data $D_0$ by one symbol and the data $D_1$ after the data $D_0$ by one symbol are inverted in the comparison circuits $CM_{1\cdot2}$ to $CM_{(n-1)\cdot n}$, data is not outputted to the counters. That is, as shown in FIG. 3C, in comparison with a case of OFF-time of the 010/101 signal elimination circuit, in a case of ON-time of the 010/101 signal elimination circuit, when $D_{-1}$ is "0", $D_0$ is "1", $D_1$ is "0" and $D_T$ is "1", Q can be set to "0" by adopting the circuit configuration shown in FIG. 3A. If it is a case of OFF-time of the 010/101 signal elimination circuit, Q is set to "1". Similarly, when $D_{-1}$ is "1", $D_0$ is "0", $D_1$ is "1" and $D_T$ is "1", Q can be set to "0" in the circuit configuration of the present embodiment.

By adjusting the waveform equalization coefficient using such a waveform equalization coefficient adjustment circuit, the adjustment time can be reduced. Note that, the delay element is not limited to a latch of one-bit delay and it can be realized using an inverter, a delay line and the like. And, the waveform equalization coefficient adjustment circuit shown in FIG. 3A has a configuration evaluating jitter or amplitude using serial data as it is, but similar effect can be obtained by a configuration converting serial data to parallel data and evaluating the jitter or the amplitude.

(Driver Circuit and Receiver Circuit)

FIG. 4A to FIG. 6 are diagrams showing one example of a driver circuit and a receiver circuit in the present embodiment.

As shown in FIG. 4A, a driver circuit 10 and a receiver circuit 20 are connected to each other through a transmission line 30. The driver circuit 10 is a circuit transmitting a signal and comprises a waveform equalization circuit (EQ) 11, an output buffer 12 connected to a subsequent stage of the waveform equalization circuit 11 and the like. The receiver circuit 20 is a circuit receiving the signal transmitted from the driver circuit 10 and comprises an input buffer 21 receiving the transmitted signal, a latch (FF) 22 and a CDR 23 connected to a subsequent stage of the input buffer 21 and the like. An output of the CDR 23 is inputted to the latch 22 as a clock.

Particularly, in the receiver circuit 20, the abovementioned waveform equalization coefficient adjustment circuit 24 of FIG. 3A is added and connected to the subsequent stage of the input buffer 21 and a measurement result of the waveform equalization coefficient adjustment circuit 24 is fed back to the waveform equalization circuit 11 in the driver circuit 10 through the transmission line 30 as a waveform equalization coefficient adjustment signal. In this configuration of the receiver circuit 20, as shown in FIG. 4C, the measurement result of the waveform equalization coefficient adjustment circuit 24 can make difference in code inversion timing distribution in comparison with a measurement result of the comparative technique shown in FIG. 4B.

Figure 5:
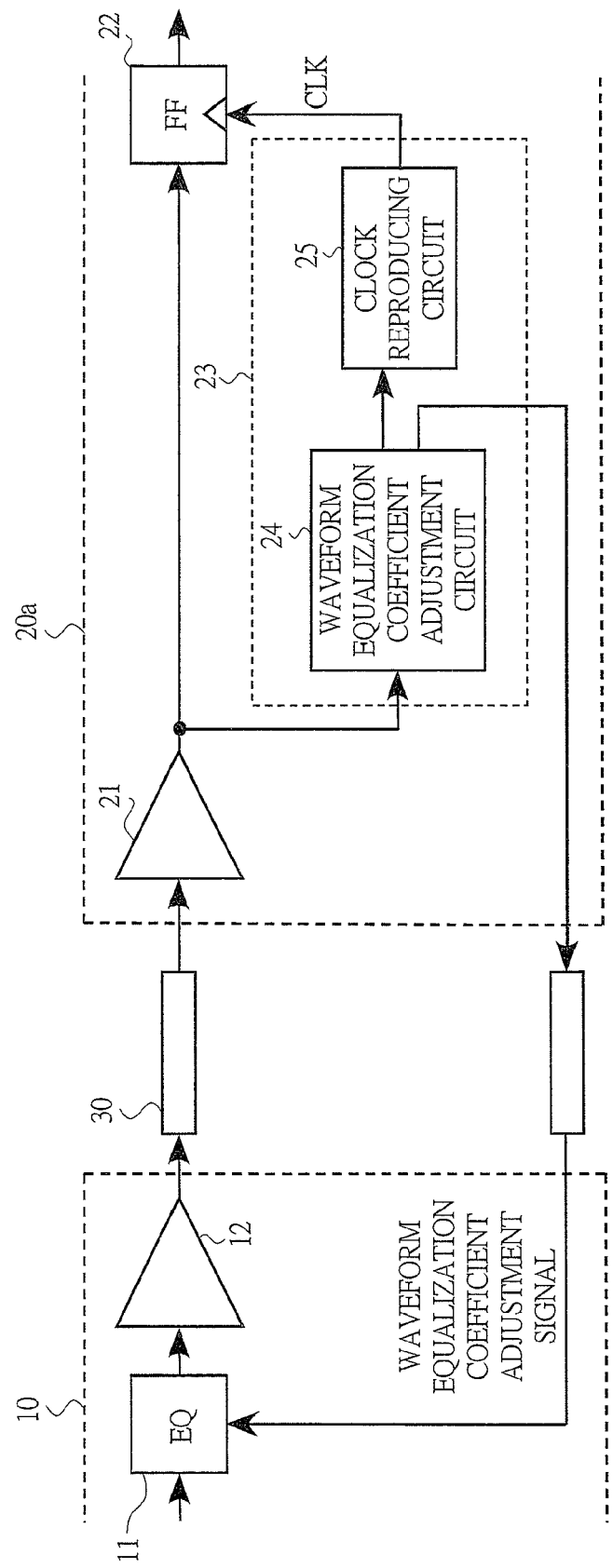
FIG. 5 is a diagram (a configuration diagram) of another example of the driver circuit and the receiver circuit of the embodiment of the present invention.

And, as shown in FIG. 5, a receiver circuit 20a can have a configuration in which the waveform equalization coefficient adjustment circuit 24 is provided in the CDR 23 positioned at the subsequent stage of the input buffer 21 and including a clock reproducing circuit 25 and the waveform equalization coefficient adjustment signal is outputted from the waveform equalization coefficient adjustment circuit 24 to the waveform equalization circuit 11 of the driver circuit 10. By adopting this circuit configuration, increase of mounting area can be suppressed in comparison with that in FIG. 4A.

Figure 6:
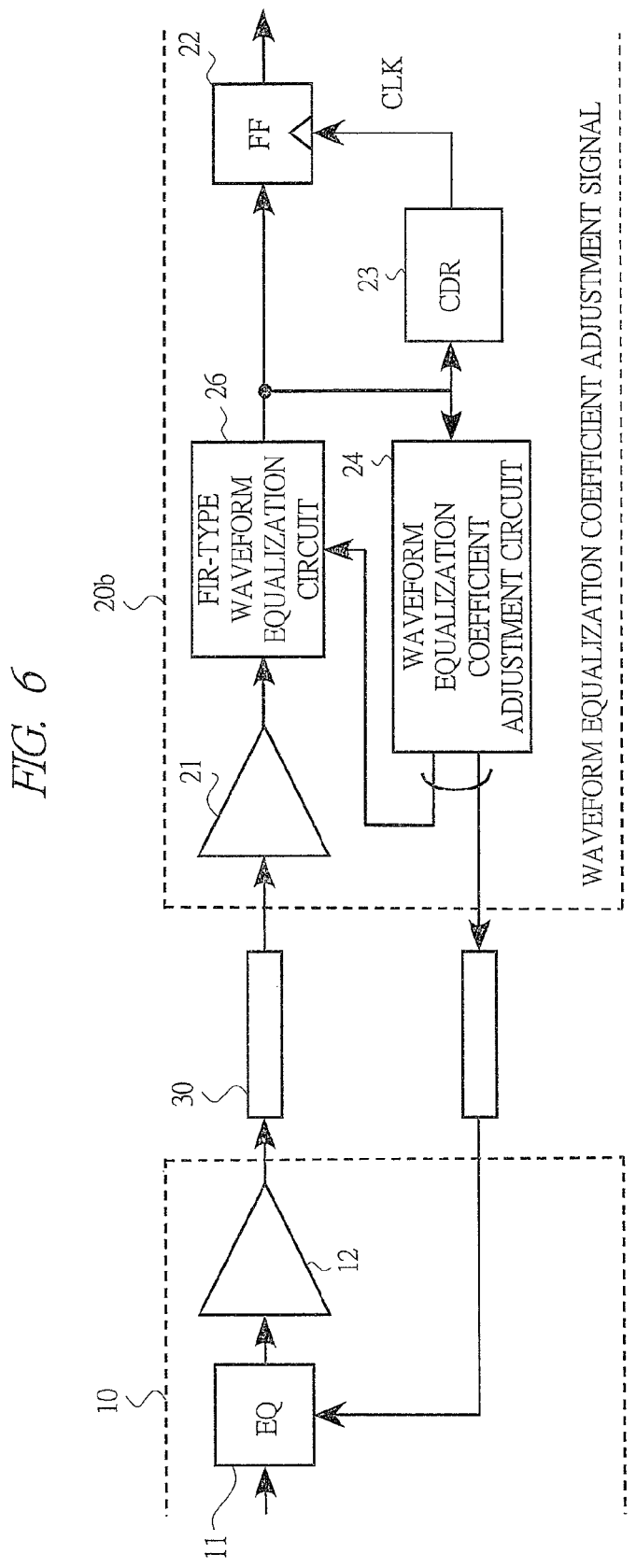
FIG. 6 is a diagram (a configuration diagram) of still another example of the driver circuit and the receiver circuit of the embodiment of the present invention.

And, as shown in FIG. 6, a receiver circuit 20b can have a configuration in which an FIR-type waveform equalization circuit 26 of an FIR-type (HPF or the like) is connected to the subsequent stage of the input buffer 21, the waveform equalization coefficient adjustment circuit 24 is connected to a subsequent stage of the FIR-type waveform equalization circuit 26 and the waveform equalization coefficient adjustment signal is outputted to the waveform equalization circuit 11 of the driver circuit 10 and the FIR-type waveform equalization circuit 26 of the receiver circuit 20b. In such a circuit configuration, a signal waveform with higher quality can be obtained in comparison with that obtained by waveform equalization performed only in a side of the driver circuit 10.

(Waveform Equalization Coefficient Adjustment Flow in Waveform Equalization Circuit)

FIGS. 7A, 7B and 7C are diagrams showing examples of waveform equalization coefficient adjustment flows taking the driver circuit and the receiver circuit in FIG. 6 as an example.

In a case (flow 1) of the FIR-type waveform equalization circuit 26, as shown in FIG. 7A, the 010/101 signal elimination circuit in the waveform equalization coefficient adjustment circuit 24 is turned ON firstly, jitter or amplitude is measured using a signal other than 010/101 signals and an FIR-type waveform equalization coefficient is roughly adjusted so as to make distribution small. Next, the 010/101 signal elimination circuit is turned OFF and the FIR-type waveform equalization coefficient is finely adjusted using all signals so as to make the distribution of the jitter or the amplitude small. Then, the operation proceeds to normal operation.

Figure 8:
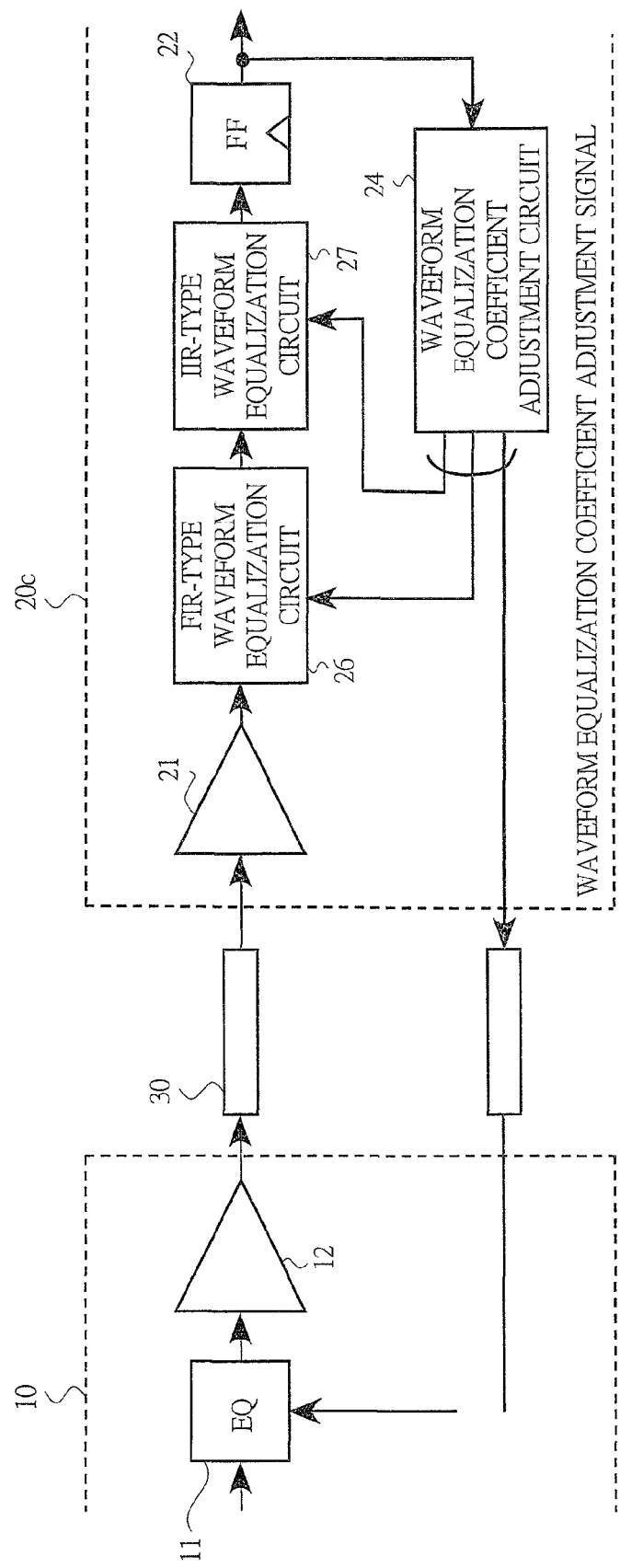
FIG. 8 is a diagram (a configuration diagram) showing still another example of the driver circuit and the receiver circuit of the embodiment of the present invention.

And, as shown in FIG. 8, similar effect can be obtained also in a receiver circuit 20c using a circuit obtained by combining the FIR-type waveform equalization circuit 26 and an IIR-type waveform equalization circuit 27 of an IIR-type (DFE or the like) instead of using only that of the FIR-type as the waveform equalization circuit. As examples of the IIR-type waveform equalization circuit 27, a first system of changing a threshold level according to the received signal and a second system of switching latch signals of different threshold levels according to the received signal to output exist and both systems are effective.

Figure 9A:
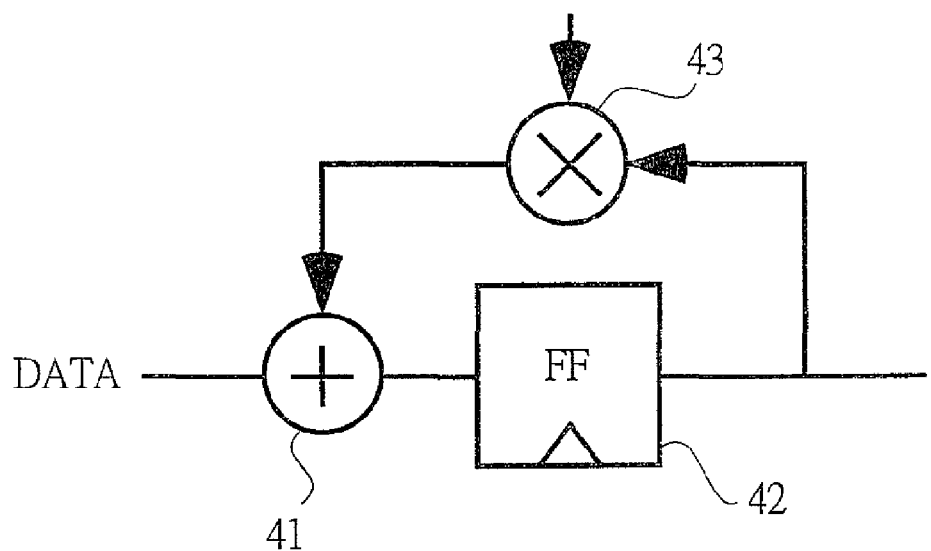
FIG. 9A is a diagram showing an example of an IIR-type waveform equalization circuit of a first system of the embodiment of the present invention.
Figure 9B:
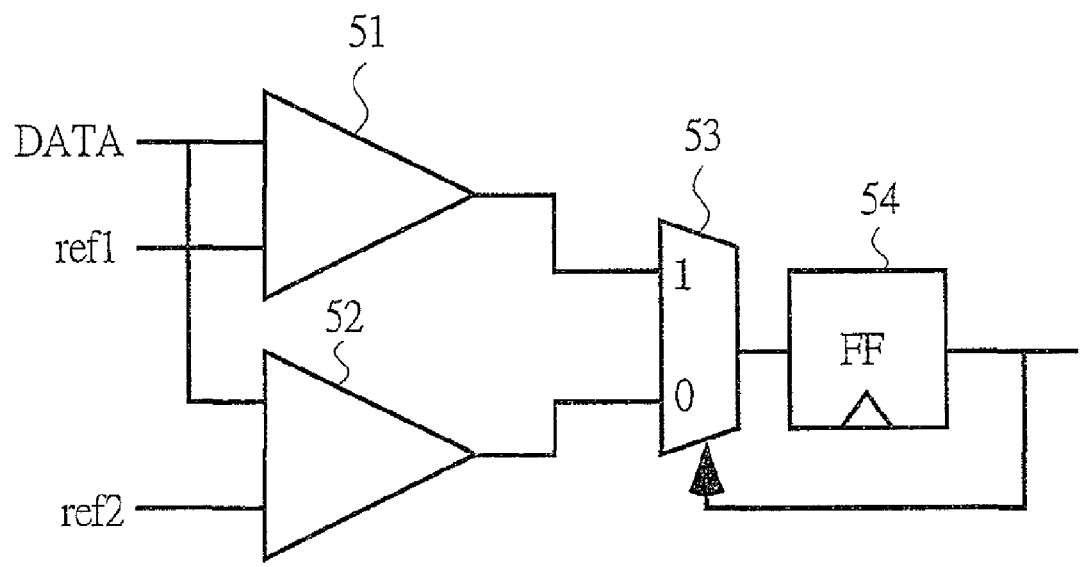
FIG. 9B is a diagram showing an example of an IIR-type waveform equalization circuit of a second system of the embodiment of the present invention.
Figure 10A:
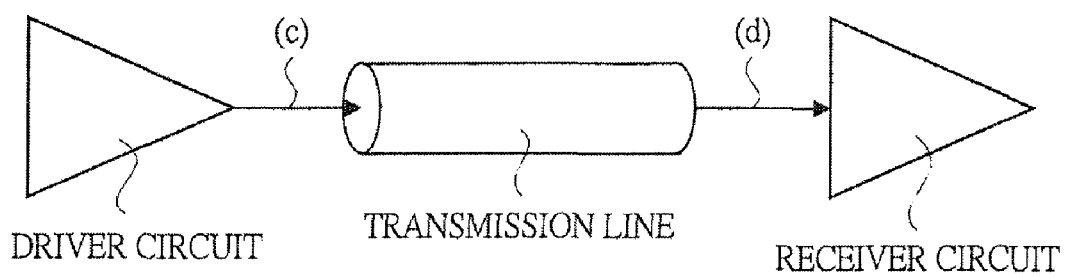
FIG. 10A is a diagram showing a configuration diagram of one example of a driver circuit and a receiver circuit of the conventional technique.
Figure 10B:
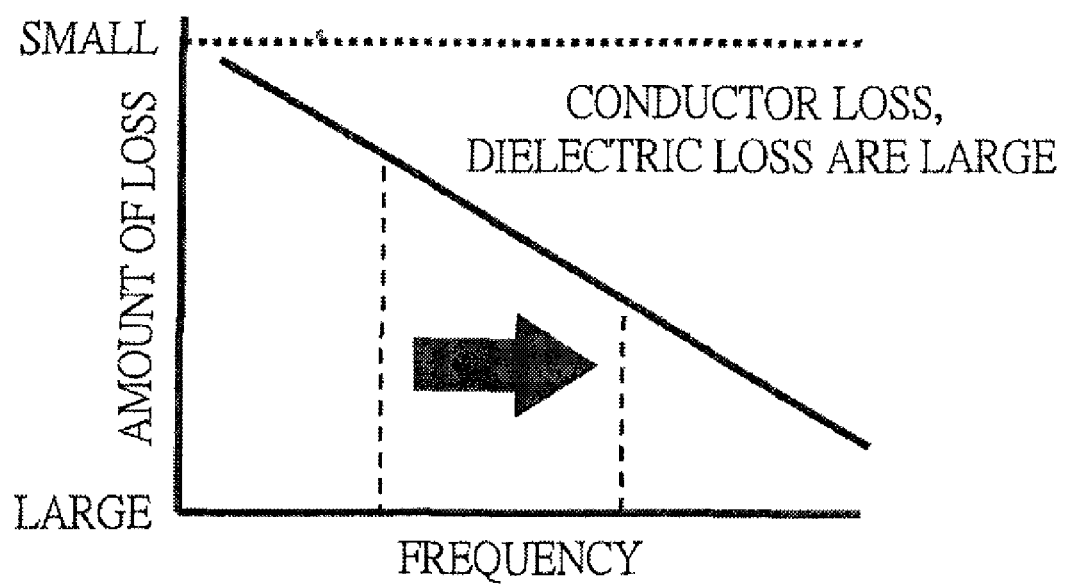
FIG. 10B is a diagram showing a loss characteristic of the one example of the driver circuit and the receiver circuit of the conventional technique.
Figure 10C:
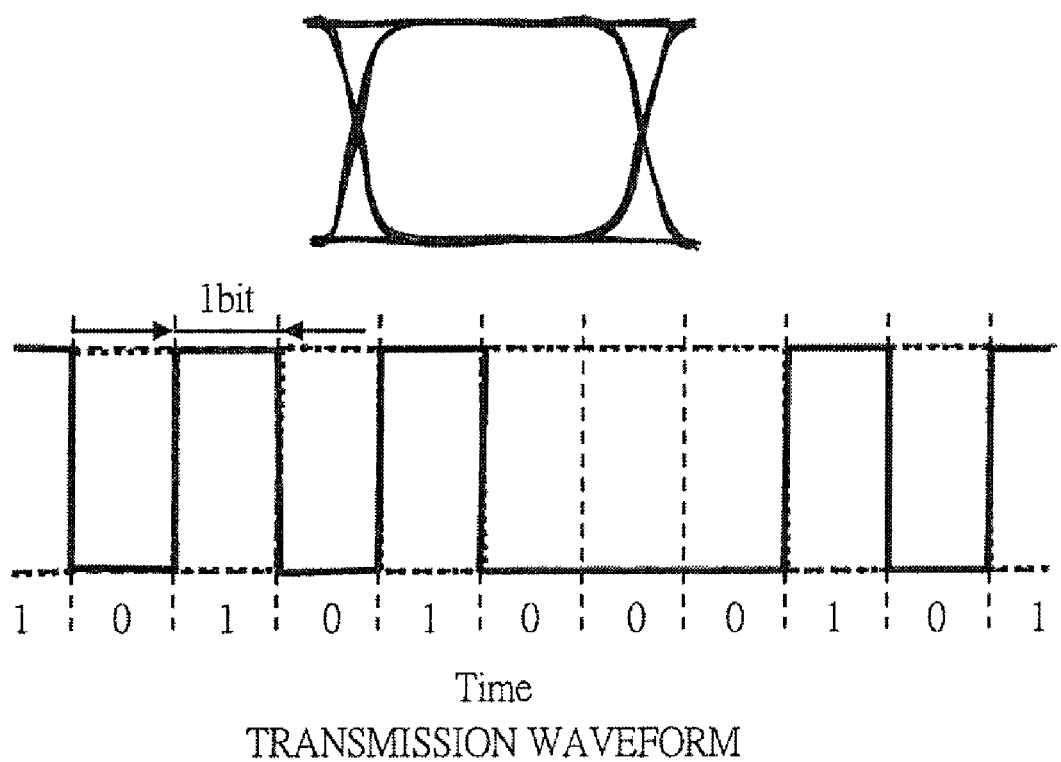
FIG. 10C is a diagram showing a transmitted waveform of the one example of the driver circuit and the receiver circuit of the conventional technique.
Figure 10D:
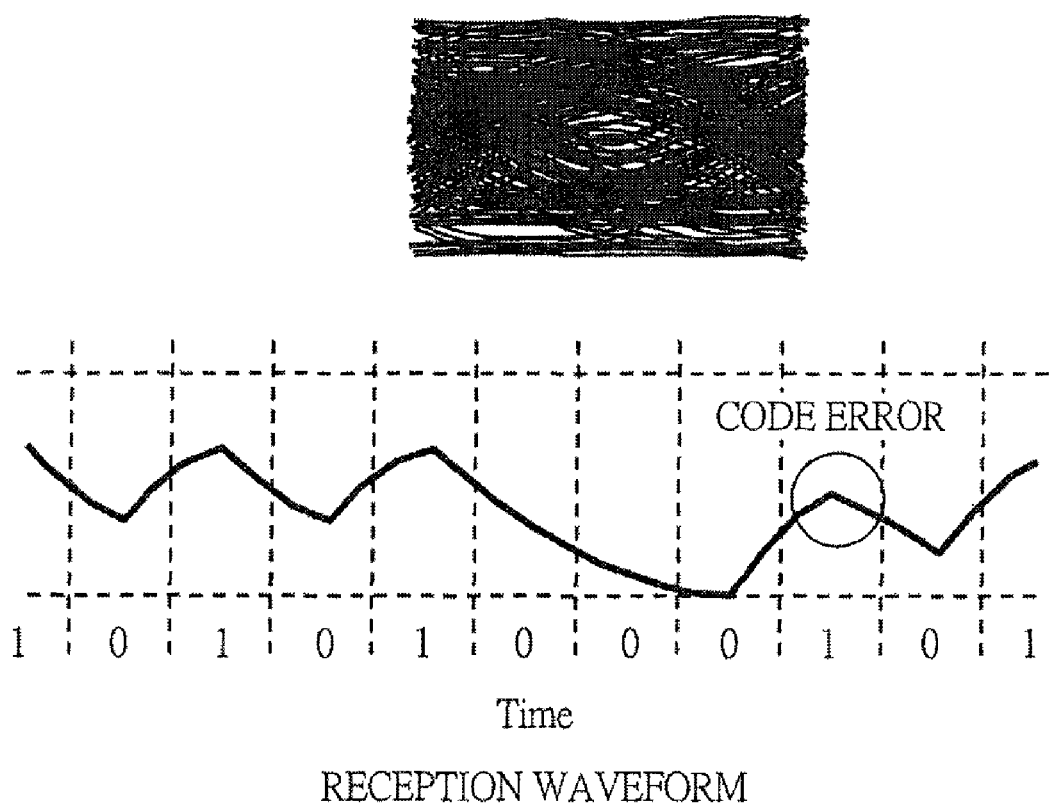
FIG. 10D is a diagram showing a received waveform of the one example of the driver circuit and the receiver circuit of the conventional technique.
Figure 13:
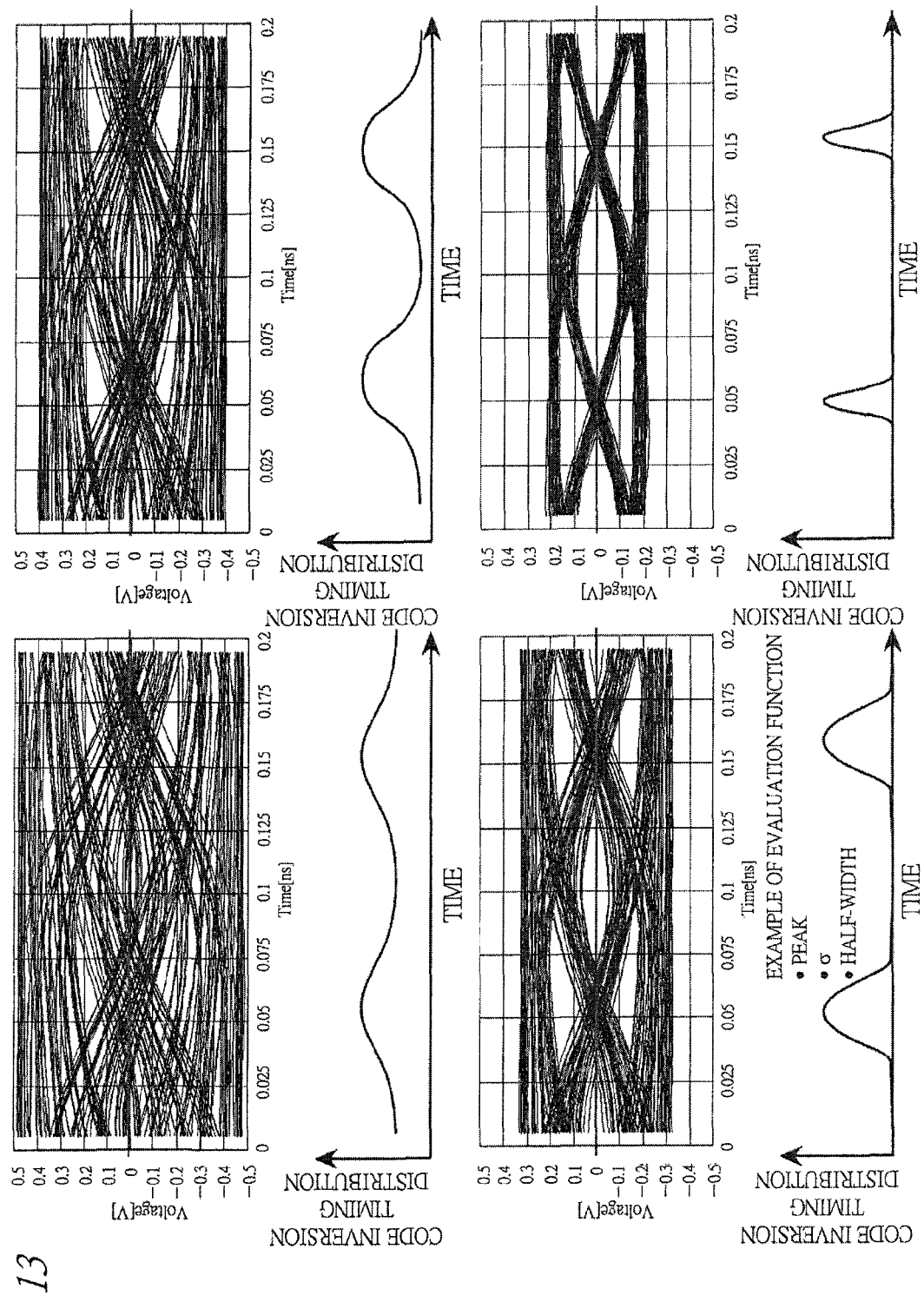
FIG. 13 is a diagram showing one example of an adjustment method of waveform equalization coefficient (code inversion timing distribution with respect to time or histogram of a code inversion timing) of the conventional technique.

As shown in FIG. 9A, the first system has a circuit configuration comprising an adder 41 having an input of data DATA, a latch 42, an accumulator 43 and the like and a threshold level can be changed according to a received signal. On the other hand, as shown in FIG. 9B, the second system has a circuit configuration comprising comparators 51 and 52 connected in parallel and having inputs of data DATA and reference voltages ref1 and ref2, a selector 53, a latch 54 and the like, and signals of different threshold levels can be switched according to a received signal and outputted.

In a case of the circuit configuration obtained by combining the FIR-type waveform equalization circuit 26 and the IIR-type waveform equalization circuit 27, a flow 2 and a flow 3 are considered as adjustment methods of the waveform equalization coefficient. In a case of the flow 2, as shown in FIG. 7B, the 010/101 signal elimination circuit in the waveform equalization coefficient adjustment circuit 24 is turned ON firstly, a waveform equalization coefficient of the FIR-type waveform equalization circuit 26 is roughly adjusted, the 010/101 signal elimination circuit is then turned OFF and the waveform equalization coefficient of the FIR-type waveform equalization circuit 26 is finely adjusted in the same manner as the flow 1. Thereafter, a waveform equalization coefficient of the IIR-type waveform equalization circuit 27 is adjusted. Then, the operation proceeds to normal operation.

And, in a case of the flow 3, as shown in FIG. 7C, after repeating fine adjustment of the waveform equalization coefficient of the FIR-type waveform equalization circuit 26 and adjustment of the waveform equalization coefficient of the IIR-type waveform equalization circuit 27 with respect to the flow 2, the operation proceeds to normal operation.

As described above, by performing the fine adjustment of the waveform equalization coefficient of the FIR-type waveform equalization circuit 26 and adjustment of the waveform equalization coefficient of the IIR-type waveform equalization circuit 27 after performing rough adjustment of the waveform equalization coefficient of the FIR-type waveform equalization circuit 26, adjustment of waveform equalization with excellent time efficiency can be realized.

(LSI, Transmission Device, Information Equipment)

Each of the receiver circuits 20 and 20a to 20c described above can be formed over a semiconductor substrate and configured as an LSI. Further, a PC, a router, a server, long-distance signal transmission equipment and the like, and an information apparatus including the equipment can be configured using the LSI. By configuring such transmission equipment or an information apparatus, adjustment time of a waveform equalization coefficient can be reduced, and therefore, time required for starting normal operation since power-on can be reduced. And, also in a case where the normal operation is stopped and the waveform equalization coefficient is re-adjusted, effect that returning to the normal operation is hastened as compared with that in the conventional technique can be obtained.

In the foregoing, the invention made by the inventors of the present invention has been concretely described based on the embodiments. However, it is needless to say that the present invention is not limited to the foregoing embodiments and various modifications and alterations can be made within the scope of the present invention.

The typical ones of the inventions disclosed in this application will be briefly described as follows.

(1) An adjustment method of waveform equalization coefficient in transmission equipment comprising a driver circuit transmitting a signal and a receiver circuit receiving the signal transmitted from the driver circuit, wherein the signal transmitted from the driver circuit is received by the receiver circuit, measurement of one of jitter and amplitude is performed only in a case of an arbitrary signal sequence in a waveform equalization coefficient adjustment circuit in the receiver circuit and a waveform equalization coefficient of a waveform equalization circuit in the driver circuit is adjusted according to a result of the measurement.

(2) The adjustment method of waveform equalization coefficient according (1), wherein the arbitrary signal sequence is data other than signal sequences of 010 and 101, and wherein the measurement of the one of the jitter and the amplitude is performed in the waveform equalization coefficient adjustment circuit using the data other than the signal sequences of 010 and 101 and the waveform equalization coefficient of the waveform equalization circuit is adjusted.

(3) A waveform equalization coefficient adjustment circuit adjusting a waveform equalization coefficient of a waveform equalization circuit comprising: n×2 latches having inputs of received data and composed of two stages connected in parallel; n−1 delay elements operating the n×2 latches in synchronized with clocks having different timings; n−1 XOR gates outputting a signal when data codes of adjacent latches are inverted in the n×2 latches; three latches connected in series and delaying the received data by one bit respectively; and n−1 comparison circuits outputting no data to a counter when a code of data $D_0$ inputted through two latches of the three latches and codes of data $D_{-1}$ before the data $D_0$ by one symbol inputted through the three latches and data $D_1$ after the data $D_0$ by one symbol inputted through one latch of the three latches are inverted, wherein measurement of one of jitter and amplitude is performed only when the received data is an arbitrary signal sequence and the waveform equalization coefficient of the waveform equalization circuit is adjusted according to a result of the measurement.

(4) A receiver circuit comprising a waveform equalization coefficient adjustment circuit adjusting a waveform equalization coefficient of a waveform equalization circuit, wherein the waveform equalization coefficient adjustment circuit comprises: n×2 latches having inputs of received data and composed of two stages connected in parallel; n−1 delay elements operating the n×2 latches in synchronized with clocks having different timings; n−1 XOR gates outputting a signal when data codes of adjacent latches are inverted in the n×2 latches; three latches connected in series and delaying the received data by one bit respectively; and n−1 comparison circuits outputting no data to a counter when a code of data $D_0$ inputted through two latches of the three latches and codes of data $D_{-1}$ before the data $D_0$ by one symbol inputted through the three latches and data $D_1$ after the data $D_0$ by one symbol inputted through one latch of the three latches are inverted, and wherein measurement of one of jitter and amplitude is performed only when the received data is an arbitrary signal sequence and the waveform equalization coefficient of the waveform equalization circuit is adjusted according to a result of the measurement.

(5) A receiver circuit receiving a signal transmitted from a driver circuit comprising: an input buffer receiving the signal transmitted from the driver circuit; a CDR connected to a subsequent stage of the input buffer; a latch connected to the subsequent stage of the input buffer and using an output of the CDR as a clock; and a waveform equalization coefficient adjustment circuit connected to the subsequent stage of the input buffer, performing measurement of one of jitter and amplitude only when received data is an arbitrary signal sequence and adjusting a waveform equalization coefficient of a waveform equalization circuit in the driver circuit according to a result of the measurement.

(6) A receiver circuit receiving a signal transmitted from a driver circuit comprising: an input buffer receiving the signal transmitted from the driver circuit; a CDR connected to a subsequent stage of the input buffer; and a latch connected to the subsequent stage of the input buffer and using an output of the CDR as a clock, wherein the CDR performs measurement of one of jitter and amplitude only when received data is an arbitrary signal sequence, and wherein a waveform equalization coefficient adjustment circuit adjusting a waveform equalization coefficient of a waveform equalization circuit in the driver circuit according to a result of the measurement is provided.

(7) A receiver circuit receiving a signal transmitted from a driver circuit comprising: an input buffer receiving the signal transmitted from the driver circuit; a waveform equalization circuit connected to a subsequent stage of the input buffer; a CDR connected to a subsequent stage of the waveform equalization circuit; a latch connected to the subsequent stage of the waveform equalization circuit and using an output of the CDR as a clock; and a waveform equalization coefficient adjustment circuit connected to the subsequent stage of the waveform equalization circuit, performing measurement of one of jitter and amplitude only when received data is an arbitrary signal sequence and adjusting waveform equalization coefficients of the waveform equalization circuit and a waveform equalization circuit in the driver circuit according to a result of the measurement.

The adjustment technique of waveform equalization coefficient of the present invention can be applied in a PC, a router, a server, long-distance signal transmission equipment and the like, and an information apparatus including the equipment.

The effects obtained by typical aspects of the present invention will be briefly described below.

According to the present invention, by measuring jitter or amplitude only in a case of an arbitrary signal sequence and adjusting a waveform equalization coefficient, adjustment time of the waveform equalization coefficient can be reduced.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. The adjustment method of waveform equalization coefficient in transmission equipment comprising a driver circuit transmitting a signal and a receiver circuit receiving the signal transmitted from the driver circuit, wherein the signal transmitted from the driver circuit is received by the receiver circuit, measurement of one of jitter and amplitude is performed only in a case of an arbitrary signal sequence in a waveform equalization coefficient adjustment circuit in the receiver circuit and a waveform equalization coefficient of a waveform equalization circuit in the driver circuit is adjusted according to a result of the measurement, wherein the arbitrary signal sequence is data other than signal sequences of 010 and 101, and wherein the measurement of the one of the jitter and the amplitude is performed in the waveform equalization coefficient adjustment circuit using the data other than the signal sequences of 010 and 101 and the waveform equalization coefficient of the waveform equalization circuit is adjusted.

2. A receiver circuit comprising a waveform equalization coefficient adjustment circuit adjusting a waveform equalization coefficient of a waveform equalization circuit, wherein the waveform equalization coefficient adjustment circuit comprises:

n×2 latches having inputs of received data and composed of two stages connected in parallel;

n−1 delay elements operating the n×2 latches in synchronized with clocks having different timings;

n−1 XOR gates outputting a signal when data codes of adjacent latches are inverted in the n×2 latches;

three latches connected in series and delaying the received data by one bit respectively; and n−1 comparison circuits outputting no data to a counter when a code of data $D_0$ inputted through two latches of the three latches and codes of data $D_{-1}$ before the data $D_0$ by one symbol inputted through the three latches and data $D_1$ after the data $D_0$ by one symbol inputted through one latch of the three latches are inverted, and wherein measurement of one of jitter and amplitude is performed only when the received data is an arbitrary signal sequence and the waveform equalization coefficient of the waveform equalization circuit is adjusted according to a result of the measurement.

3. A receiver circuit receiving a signal transmitted from a driver circuit comprising:

an input buffer receiving the signal transmitted from the driver circuit;

a CDR connected to a subsequent stage of the input buffer;

a latch connected to the subsequent stage of the input buffer and using an output of the CDR as a clock; and a waveform equalization coefficient adjustment circuit connected to the subsequent stage of the input buffer, performing measurement of one of jitter and amplitude only when received data is an arbitrary signal sequence and adjusting a waveform equalization coefficient of a waveform equalization circuit in the driver circuit according to a result of the measurement.

4. The receiver circuit according claim 3,
wherein the arbitrary signal sequence is data other than signal sequences of 010 and 101,
wherein the measurement of the one of the jitter and the amplitude is performed in the waveform equalization coefficient adjustment circuit using the data other than the signal sequences of 010 and 101 and the waveform equalization coefficient of the waveform equalization circuit is adjusted at first accuracy so as to make distribution of the one of the jitter and the amplitude small, and
wherein the measurement of the one of the jitter and the amplitude is performed in the waveform equalization coefficient adjustment circuit using data of all signal sequences and the waveform equalization coefficient of the waveform equalization circuit is adjusted at second accuracy higher than the first accuracy so as to make the distribution of the one of the jitter and the amplitude small.

5. The receiver circuit according to claim 3,
wherein the receiver circuit is formed over a semiconductor substrate and configured as an LSI.

6. Transmission equipment using the receiver circuit according to claim 5,
wherein the transmission equipment is configured using the LSI formed over the semiconductor substrate.

* * * * *